Jan. 2, 1934.  G. A. LYON  1,941,564
COMBINATION TIRE COVER AND LUGGAGE CARRIER
Filed June 30, 1931   2 Sheets-Sheet 1
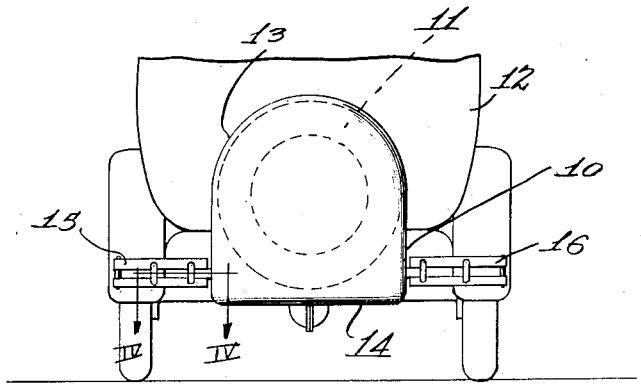
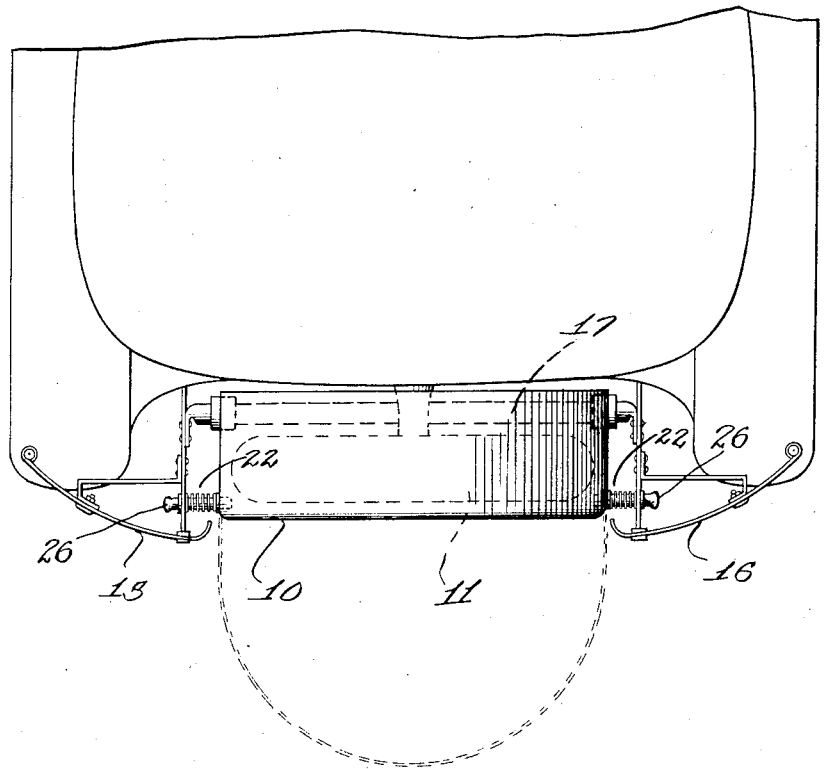
Inventor
George Albert Lyon.
by Charles Hill
Attys.

Jan. 2, 1934.  G. A. LYON  1,941,564
COMBINATION TIRE COVER AND LUGGAGE CARRIER
Filed June 30, 1931   2 Sheets-Sheet 2
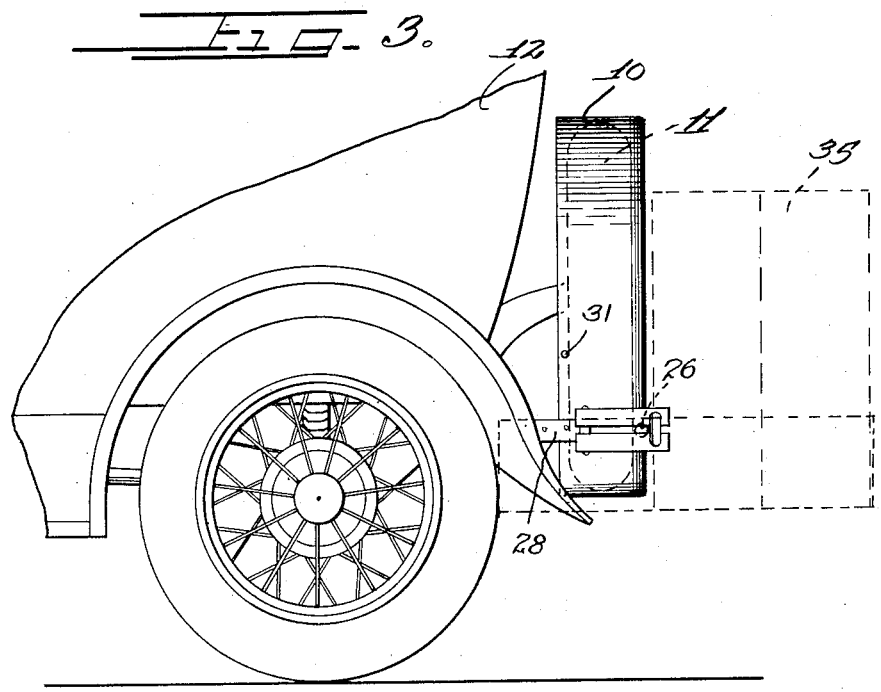
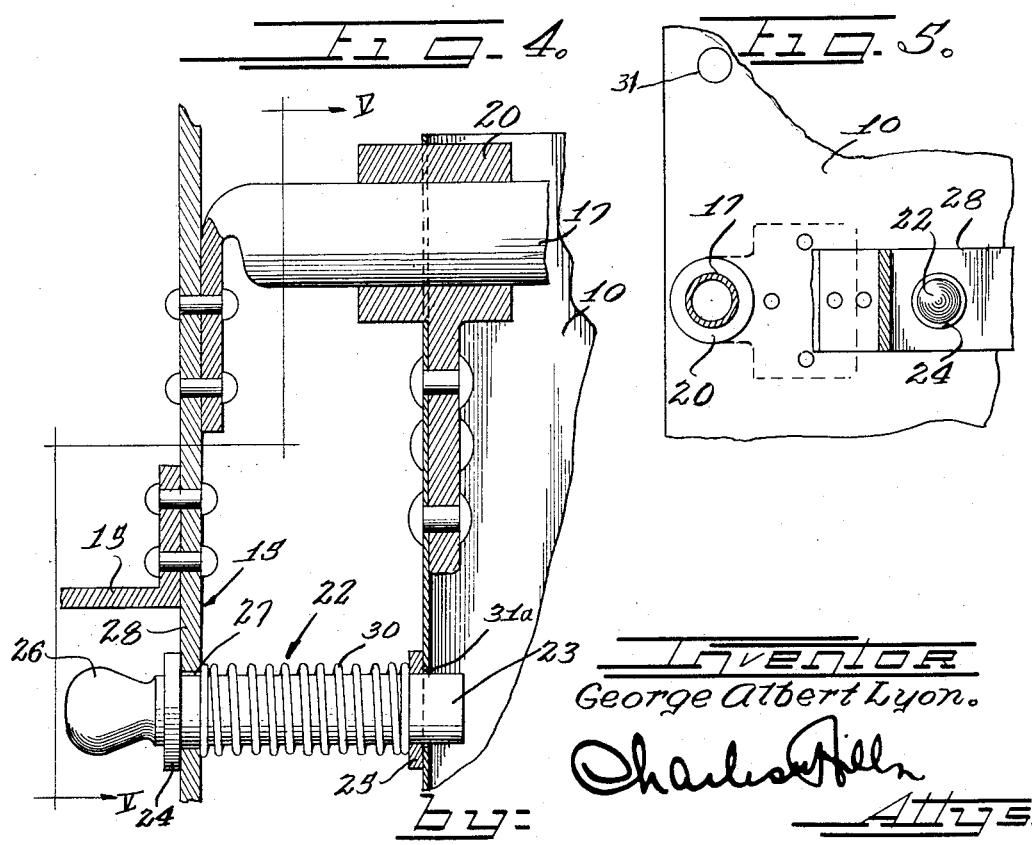
Inventor
George Albert Lyon.

Patented Jan. 2, 1934

1,941,564

UNITED STATES PATENT OFFICE 1,941,564

COMBINATION TIRE COVER AND LUGGAGE CARRIER

George Albert Lyon, Allenhurst, N. J., assignor to Lyon Incorporated, Asbury Park, N. J., a corporation of Delaware Application June 30, 1931. Serial No. 547,931

4 Claims. (Cl. 224—29)

This invention relates to tire covers, and more particularly to a combination tire cover and luggage carrier.

The aim of the present invention is to provide a tire cover of such construction that it not only has the usual advantages of affording protection for the tire housed therein, but also affords another use to the extent that it may be used to accommodate luggage, parcels and the like.

In accordance with the general features of this invention there is provided a tire cover adapted to substantially enclose the rear spare tire of an automotive vehicle and which is so formed and arranged with respect to the rest of the vehicle that it is movable into a position in which it constitutes a closure for the spare tire and yet is movable into another position in which it constitutes a carrier for luggage, parcels and the like.

Other objects and features of this invention will more fully appear from the following detailed description taken in connection with the accompanying drawings which illustrate a single embodiment thereof, and in which Figure 1 is a fragmentary rear view of an automobile equipped with a tire cover and luggage carrier embodying the features of this invention.

Figure 2 is a plan view of that carrier illustrating in dotted lines the position to which the tire cover or carrier is movable when it is desired to utilize such carrier for luggage and the like.

Figure 3 is a side view of the carrier illustrating it applied to an automotive vehicle and illustrating the position of the tire cover or carrier in dotted lines when the same is being used as a luggage carrier or the like.

Figure 4 is an enlarged fragmentary sectional view taken substantially on the line IV—IV of Figure 1, looking in the direction indicated by the arrows, and Figure 5 is a fragmentary sectional view taken substantially on the line V—V of Figure 4, looking in the direction indicated by the arrows.

As shown on the drawings:

The reference numeral 10 designates generally a housing or cover for the spare tire 11 at the rear of the automobile 12. It will be readily noted from the drawings that the tire cover 10 does not have a snug fit on the tire but is merely formed of such size and shape as to enable it to house and enclose the exposed portions of the tire and wheel.

The cover 10 may be made of any suitable material such for example as sheet metal and includes an arcuate or curved outer periphery 13 terminating at the bottom of the cover in a substantially straight or flat bottom strip 14. Moreover the cover is of such a width as to enable it to be disposed between a pair of bumperettes 15 and 16 such as are frequently used on Ford automobiles. From Figure 2 it is to be observed that the spaced bumperettes 15 and 16 are anchored to the automobile chassis in the usual way and include a transverse reinforcing bar or rod 17.

The tire cover 10 is adapted to be pivotally mounted on a suitable rod at the rear of the vehicle such for example as the rod or bar 17. To this end the cover 10 is provided with a pair of spaced rearwardly extending bracket members 20 loosely and pivotally disposed on the transverse rod 17 (Figure 4). These two brackets are connected to the lower portion of the cover 10 whereby the cover may be swung from the full line position shown in Figures 2 and 3 to the horizontal dotted line position so as to enable the cover to thereafter be used as a carrier for luggage and the like. This arrangement is highly advantageous since it enables the single covering device to be used both as a cover and as a luggage carrier thereby providing the cover with further utility.

Now in order to insure that the cover will be maintained in the horizontal position when it is being used as a luggage carrier I find it necessary to provide on each side of the cover plunger means for latching or holding the cover in the aforesaid horizontal position. Inasmuch as the two plunger devices are identical in construction it is thought that a description of one will suffice for both.

Each plunger device 22 (Figures 2 and 4) is associated with and connected to one of the bumperettes so that the same is supported thereby. This plunger device includes a plunger rod 23 having connected to it two spaced shoulders 24 and 25 and having one end provided with a handle-like knob 26 by which the plunger may be withdrawn out of latched or engaged cooperation with the cover 10. This rod 23 extends through an aperture 27 in a horizontal bracket part 28 of the bumperette and has its shoulder or collar 24 positioned to engage on an outer side of the bracket part 28 as shown in Figure 4. Surrounding the plunger rod 23 and disposed between the other side of the bracket part 28 and the collar or shoulder 25 is a compressible spring 30 which acts to at all times urge the plunger rod 23 in a direction away from the bumperette and toward the side of the cover 10. The free end of the plunger rod 23 is adapted, when the cover is in a horizontal or luggage carrying position, to engage and fit in an opening 31, and when in a vertical or tire covering position, to engage and fit in an opening 31ª, formed in the side wall of the cover 10. When the plunger rod is thus engaged with the cover the shoulder or collar 25 on the plunger rod engages the outer surface of the corresponding side wall of the cover.

Now needless to say it will of course be evident that when the cover is in a luggage carrying position and is so engaged by the two latching or holding plungers 22—22 it is held against rattling and from falling below the horizontal dotted line position shown in Figure 3. This cover when in luggage carrying position is of such size and shape that it will readily receive luggage such as suitcases and the like which are illustrated by dotted lines in Figure 3 and designated by the reference numeral 35.

On the other hand when it is desired to return the cover to its vertical or tire protecting position a return movement of the cover may be readily effected by merely pulling outwardly on the knobs 26 of the plungers whereby the plungers are pulley away from each other and out of cooperation with the cover 10 thereby enabling the cover to then be readily swung about the rod 17 into the vertical or tire protecting position.

Now it is of course to be understood that although I have illustrated and described in detail the preferred embodiment of this invention, the invention is not to be thus limited but only insofar as defined by the scope and spirit of the appended claims.

I claim as my invention:

1. A combination tire cover and luggage carrier comprising a shallow one-piece receptacle having an open top and of sufficient depth to receive an entire spare tire and means for selectively supporting said receptacle in upright and horizontal positions according as the receptacle is to serve one or the other of its purposes said means being located above the bottom and at the rear side of the receptacle when the latter is on the tire for pivotally supporting the receptacle for a swinging movement both downwardly and under the tire into a horizontal position in which the receptacle is disposed substantially below and on both sides of said means.

2. In combination with an automobile having spaced bumpers and bracing means therefor including a rod extending transversely of the automobile and connected to the bumpers, said automobile carrying a spare tire between the bumpers, a shallow receptacle pivotally mounted on said rod and arranged, when extending vertically, to conceal the outer side and entire tread portions of the spare tire, and when extending horizontally to receive a trunk or the like, the side walls of the receptacle serving to position the trunk or the like, and means for securing said receptacle selectively in tire covering and trunk receiving positions, said means comprising a plunger carried by one of the bumpers and cooperating openings in said receptacle.

3. For use in combination with an automobile having spaced bumper members and bracing means therefor including a rod extending transversely of the automobile and connected to the bumper members, said automobile carrying a spare tire between the bumper members, a shallow box-like member pivotally mounted on said rod and arranged, when extending vertically, to conceal the outer side and entire tread portions of a spare tire, and when extending horizontally, to receive a trunk or the like, means for securing said box-like member selectively in vertical and horizontal positions, said means comprising a spring pressed plunger carried by one of the members and selectively cooperating openings in another of said members.

4. For use in combination with an automobile carrying a spare tire, a cover pivotally carried by the automobile independently of the spare tire, means for holding the cover in vertical position to conceal the spare tire and in horizontal position to serve as a luggage carrier, said cover comprising a one-piece receptacle having a depth commensurate with the width of the tire whereby to conceal the entire tread as well as the outer wall of the tire, the side walls of the receptacle serving to position the luggage carried thereby means for pivotally supporting the lower part of the cover on the vehicle and having a pivot located above the bottom of the cover to provide for the swinging of the cover both downwardly and under the tire into a horizontal position in which the cover is disposed substantially below and on both sides of said pivot.

GEORGE ALBERT LYON.